Aug. 19, 1969  J. L. SWICKARD ET AL  3,461,495
PELLETIZING DIE PLATE
Filed June 1, 1967  2 Sheets-Sheet 1
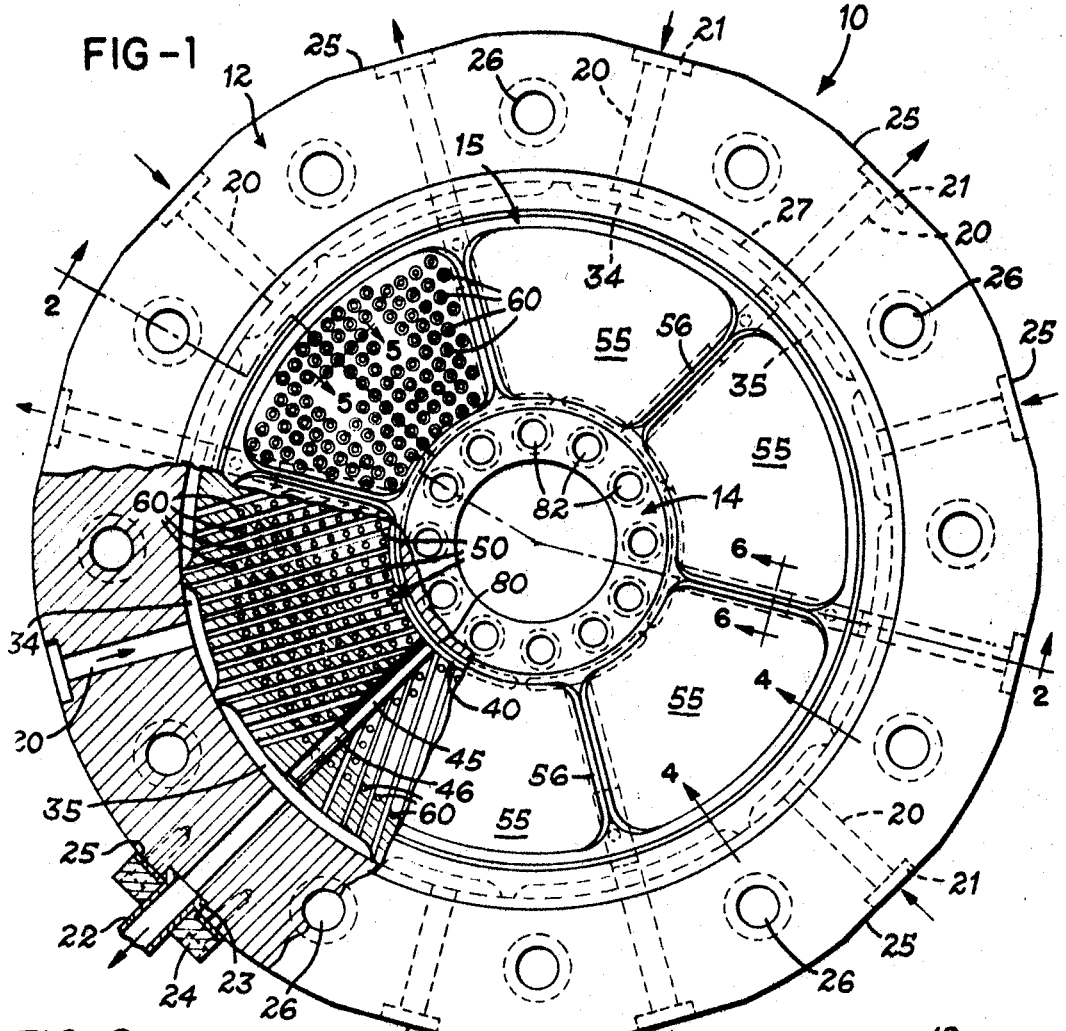
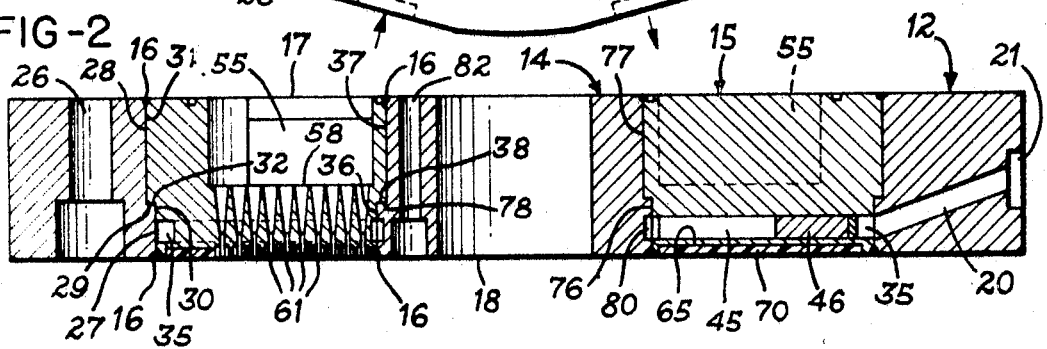
INVENTORS
JAMES L. SWICKARD &
HERSHEL L. CURATI
BY
Marechal, Biebel, French & Bugg
ATTORNEYS

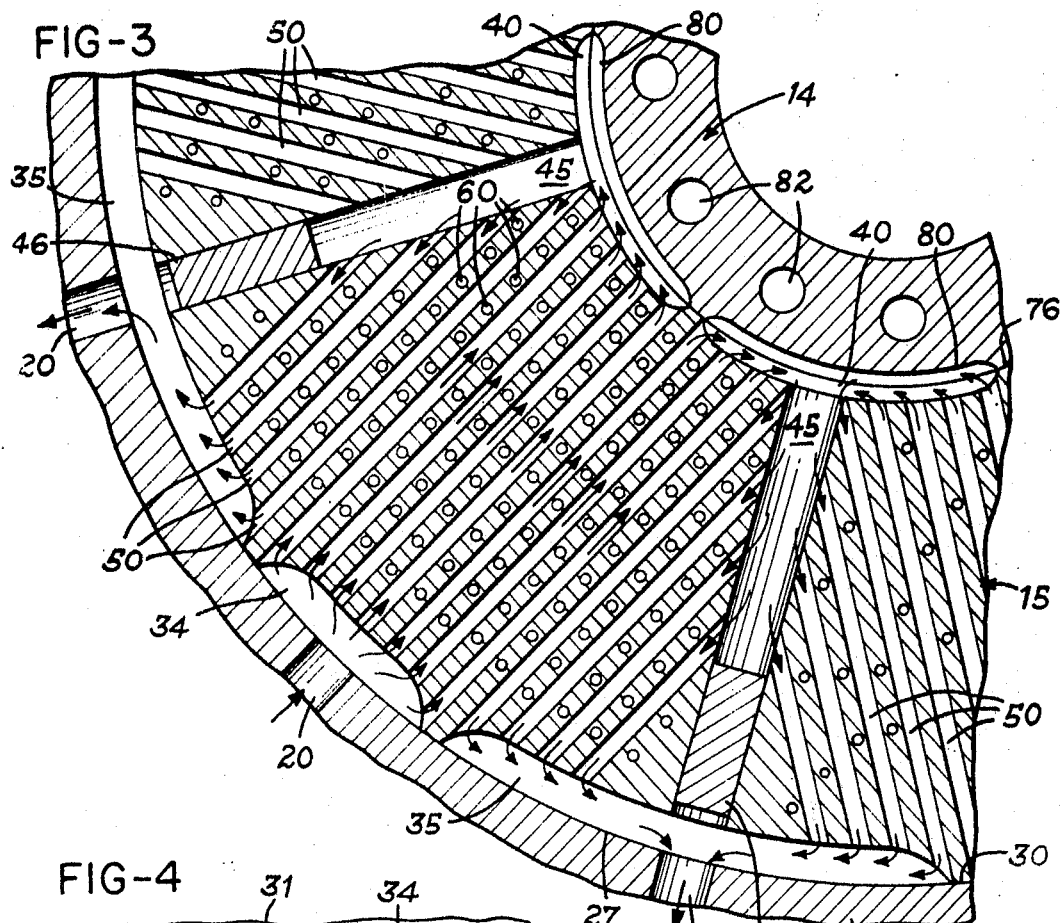
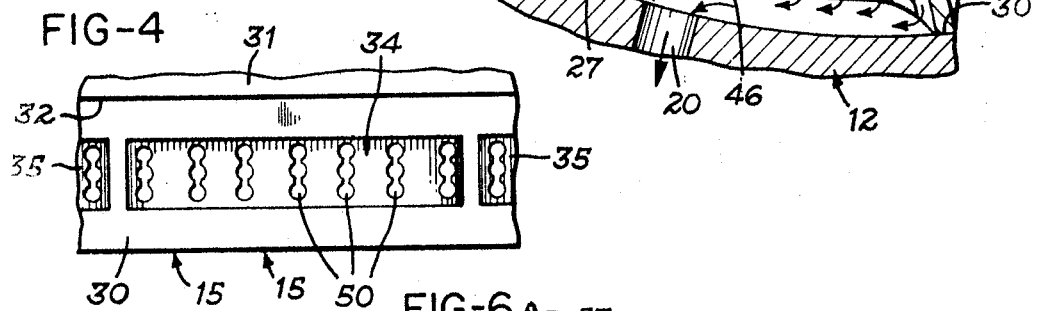
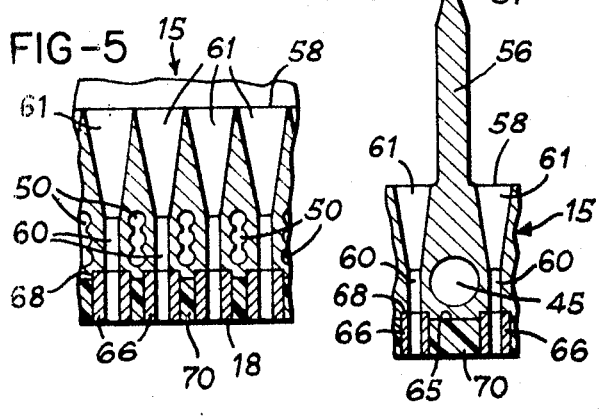

United States Patent Office 3,461,495
Patented Aug. 19, 1969

3,461,495
PELLETIZING DIE PLATE
James L. Swickard, Toledo, and Hershel L. Curati, Fairfield, Ohio, assignors to The Black-Clawson Company, Hamilton, Ohio, a corporation of Ohio
Filed June 1, 1967, Ser. No. 642,880
Int. Cl. B29f 3/00
U.S. Cl. 18—12                                        11 Claims

ABSTRACT OF THE DISCLOSURE

A die plate for a plastic pelletizer having radially extending manifolds dividing the plate into arcuate segments for the purpose of applying heat to the die plate in which each segment is formed with parallel heated fluid passageways some of which intersect the manifolds on each side of the segment and some of which open into cavities providing for the return flow of heating fluid, in which extrusion orifices are arranged in parallel rows between the heating passageways to receive heat therefrom, and in which the die plate is formed with radial reinforcing ribs on the inlet side corresponding to the position of the radial manifolds.

Background of the invention

As disclosed in U.S. Patents Nos. 3,287,764 and 3,230,582 which are assigned to the assignee of the present invention, it is desirable to provide uniform heating of the die plate for a plastic pelletizer to obtain a uniform flow of the molten plastic polymer through the die plate orifices. That is, it is desirable to avoid partial solidyfying of the material in some of the orifices and a high flow rate in other orifices so that the pellets are cut to a uniform length by the rotary knife adjacent the die plate.

The viscosity for some polymers, such as polypropylene, changes quickly with changes in temperature and frequently the ideal temperature range for extrusion extends only a few degrees and occurs at a high absolute temperature. If the temperature in any part of the die falls below this range, the polymer begins to solidify, while a temperature above this range causes the material to become less viscous and flow too rapidly through the orifice. Also, many such materials are subject to rapid degradation if they are permitted to dwell or become stagnant while at an excessive temperature. It is therefore important that all parts of the die plate receive a uniform flow of plastic melt for extrusion without stagnant areas or regions.

As disclosed in Patent No. 3,287,764 substantially uniform heating of the die plate adjacent the orifices is obtained by forming generaly radially extending orifice rows and generaly radialy extending heating fluid passageways between the orifice rows in which heating fluid, such as hot oil, is circulated through the passageways. As a result of the diverging relation of the radially extending passageways for heating fluid, and orifice rows, the radial dimension of the annular arrangement of orifices must be limited in relation to its outer diameter so that the spacing between each row of orifices and the adjacent heating fluid passageways does not vary substantially. In larger diameter die plates, the spacing between adjacent nozzles in the annular outer row tends to become unnecessarily great thus significantly limiting the total number of orifices, and thereby limiting the capacity of the pelletizer. Also the change in distance between fluid pasageways and nozzles may result in non-uniform temperature distribution and uneven pellet length.

Summary of the invention

The present invention is directed to a die plate which preferably is formed in three annular sections, such as disclosed in the Patent 3,287,764 and includes an improved arrangement of the heating fluid passageways so that a substantial number of orifices may be formed within the intermediate section of the die plate, with each orifice in close uniformly spaced relation to a heating fluid passageway, so that all of the orifices are uniformly heated and the plastic material flows at a constant rate through the orifices. In accordance with a preferred form of the invention, the above features are provided by forming a plurality of uniformly-arranged, radially-extending manifolds within the intermediate section of the die plate thereby dividing the plate into a corresponding plurality of arcuate segments. Parallel, spaced heating fluid passageways are formed within each arcuate segment and with a portion of the passageways extending through the intermediate section of the die plate and a portion of the passageways intersecting the radially extending manifolds.

Axially extending extruding orifices are formed in parallel rows between the passageways so that the orifices are unformly heated. The inner and outer annular sections of the die plate cooperate with the center section to define a plurality of inner and outer angularly spaced chambers or manifolds which interconnect the corresponding inner and outer ends of groups of passageways in such a manner to provide for a substantial flow of heating fluid through the intermediate annular section of the die plate. The polymer inlet face of a die plate constructed in accordance with the invention is also provided with a corresponding plurality of angularly spaced arcuate cavities which cooperate to form reinforcing ribs and thereby enable the orifices to be constructed with a minimum axial length to minimize the back pressure required for any given rate of extrusion.

It is accordingly an important object of this invention to provide a pelletizer die plate having an improved arrangement for applying heat to the extrusion nozzles.

Another important object of this invention is the provision of a pelletizer die plate, as outlined above, having an arrangement of nozzles adapted for large die plate diameters, maintaining a uniformly high density of extrusion nozzles in the outer periphery of the extrusion zone.

A further object of this invention is to provide a die plate formed with generally radially extending reinforcing ribs so that the extrusion orifices between the ribs may be of relatively shorter axial length to reduce the back pressure required for extrusion through the die.

Another object of this invention is the provision of a plastic pelletizer die plate as outlined above, in which an intermediate section or portion of the die plate is formed into a plurality of equally spaced arcuate segments for the purpose of heating the die plate, bounded by generally radial manifolds for providing for return flow with generally parallel heating passages extending from positions outwardly of the array of nozzles, some of which terminate at the radial manifolds and others which terminate at inwardly formed cavities providing for a return flow therefrom into such manifolds.

These and other objects and features of the invention will be apparent from the following description, the accompanying drawings and the appended claims.

Brief description of the drawings

FIG. 1 is a view of the inlet face of a die plate constructed in accordance with the invention and having a portion broken away to show internal construction;

FIG. 2 is a section taken generally along the line 2—2 of FIG. 1;

FIG. 3 is a fragmentary enlarged section of the die plate shown in FIG. 1;

FIG. 4 is a view taken generally along the line 4—4 of FIG. 1;

FIG. 5 is a section taken generally along the line 5—5 of FIG. 1; and

FIG. 6 is a section taken generally along the line 6—6 of FIG. 1.

Description of a preferred embodiment

Referring to the drawings, FIG. 1 shows a die plate 10 constructed in accordance with the invention and which generally includes three rings or annular sections comprising an outer section 12, an inner section 14 and an intermediate or center section 15. These sections are rigidly secured together in concentric relation by annular welds 16 (FIG. 2) on both the inlet face 17 and the discharge face 18 of the die plate.

The outer section 12 is formed with a plurality of passages 20 (FIGS. 1 and 2) which are uniformly spaced and are each provided with a counterbore 21 for connecting alternate inlet and outlet conduits 22 each having an inner flange 23 inserted within the counterbore 21. Each conduit 22 is secured to the outer section 12 by a surrounding collar 24 which is fastened to a corresponding flat surface 25 formed on the outer periphery of the outer section 12. A series of axially extending counterbored holes 26 are formed within the outer section 12 between the passages 20 for receiving screws which secure the outer portion of the die plate to the body of a pelletizer as shown in the above mentioned patent. A cylindrical inner surface 27 and a slightly larger cylindrical surface 28 are formed on the outer section 12 of the die plate and are joined by an annular shoulder 29.

The center section 15 of the die plate is formed with outer cylindrical surfaces 30 and 31 which interfit with the corresponding surfaces 27 and 29 and are joined by an annular external shoulder 32 which seats on the internal shoulder 29. Referring to FIGS. 3 and 4, the outer cylindrical surface 30 is provided with a series of alternately arranged, slot-like arcuate chambers 34 and 35 which are spaced in correspondingly aligned relation with the passages 20 formed within the outer section 12.

A cylindrical inner surface 36 (FIG. 2) and slightly larger cylindrical surface 37 are formed on the center section 15 and are joined by an annular shoulder 38. A series of angularly spaced slot-like arcuate chambers 40 are partially formed within the inner cylindrical surface 36 (FIG. 3) of the center section 15 and are uniformly arranged with each chamber having substantially the same arcuate length.

A series of uniformly arranged and angularly spaced cylindrical manifolds 45 (FIGS. 1–3) extend radially within the center section 15 between each of the inner chambers 40 and the corresponding outer chambers 35 and effectively divide the center section 15 into a corresponding plurality of arcuate sections for the purpose of heating the die plate. An elongated cylindrical plug 46 is pressed into each of the manifolds 45 closing the radially outer end thereof and is located within the outer portion adjacent the corresponding outer chamber 35.

A series of generally parallel spaced passageways 50 (FIGS. 3–5) is formed within the center section 15 extending from the outer periphery of the section 15 inwardly. Each of the passageways has a cross-sectional dimension in an axial direction (FIG. 4) which is substantially greater than the cross-sectional dimension in a circumferential direction as an example, this may be accomplished by drilling three axially spaced interconnecting holes as shown in FIG. 4 and broaching to form a single smooth elongated opening. Referring to FIG. 3, a number or central group of the passageways 50 in the center portion of the sector extend from each of the outer chambers 34 to the corresponding end portions of a pair of adjacent inner chambers 40 which are overlapped by the chamber 34. Adjacent groups of the passageways 50 extend from each adjacent outer chamber 35 to intersect each of the manifolds 45.

As shown in FIGS. 1 and 2, a corresponding plurality of arcuate cavities 55 are formed within inlet face 17 of the center die plate section 15, and are angularly spaced to form ribs 56, each rib being positioned in axial alignment with a corresponding manifold 45. Each rib 56 has a tapered V-shaped leading edge portion 57 as shown in FIG. 6. Each cavity 55 includes a flat inner 58 from which parallel spaced rows of orifices 60 extend axially through the die plate between the passageways 50. Each orifice 60 includes a conical shaped inlet portion 61 (FIG. 5) which has its largest diameter adjacent the inner surface 58 of the cavity 55.

The discharge or cutting face 18 of the center die section 15 may be formed with a generally flat annular cavity 65 (FIGS. 5 and 6) in which are located tubular hardened tip members 66 (FIG. 5) which form axial extensions of the orifices 60. A counterbore 68 (FIG. 5) extends from the cavity 65 concentric with each of the orifices 60 and receives the inner end portion of the corresponding tip member 66. An insulation material 70 is formed within the cavity 65 surrounding each of the tip members 66 to minimize heat transfer to the water which contacts the cutting face of the die plate.

The inner section 14 of the die plate 10 includes an outer cylindrical surface 76 and a slightly smaller cylindrical surface 77 which interfit with the cylindrical surfaces 36 and 37 of the center section 15 and are connected by an annular external shoulder 78 which seats on the internal shoulder 38. As shown in FIG. 3, the outer cylindrical surface 76 of the inner section 14 is formed with a series of circumferentially spaced slot-like arcuate walls 80 which are aligned with and form closures for the chambers 40, and cooperate therewith to provide chambers of substantial cross-sectional area. The inner die plate section 14 is also provided with a series of counterbored holes 82 (FIG. 2) through which screws extend for securing the inner portion of the die plate to a stationary mandrel extending within the body of the pelletizer as shown in the above patent.

Referring to FIGS. 1 and 3, the center section 15 of the die plate 10 is heated by introducing heating fluid, preferably hot oil, into alternate passages 20 which open into the chambers 34. The fluid flows inwardly within the parallel spaced passageways 50 extending from each chamber 34 thereby heating the surface defining the interspaced rows of orifices 60. The hot oil is directed by the inner chambers 40 and 80 to the manifolds 45 where the oil flows outwardly into the passageways 50 intersecting the manifolds 45 and thereby heats the rows of orifices 60 spaced between these passageways. The oil is collected within the outer chambers 35 for discharge to the corresponding oulet passages 18 extending from the chambers 35 through the outer die plate section 12. While the direction of flow indicated by the arrows in FIG. 3 is preferred, it is to be understood that the flow direction could be reversed, that is, with the hot oil being supplied to the chambers 35 and discharged from the chambers 34.

From the drawings and the above description, it can be seen that a die plate constructed in accordance with the invention provides several desirable features and advantages. For example, by arranging the passageways 50 and the rows of interspaced orifices 60 in parallel spaced relation, the metal thickness between each passageway 50 and the adjacent orifices 60 is uniform which provides for uniform heat transfer to the plastic material flowing through the orifices. The parallel spaced relation of the passageways and orifices also enables the forming of a substantial number of orifices in each row so that a large capacity can be obtained from a given diameter of die plate.

Furthermore, by directing the hot oil inwardly through a group or plurality of passageways 50 from each chamber 34 and outwardly through the manifolds 45 and the corresponding group of intersecting passageways 50, a substantial flow of oil can be obtained through the die plate which aids in producing a uniform heating of the center section of the die plate, and permits operation at highly elevated temperatures. The die plate operates at a more uniform temperature, and less temperature differential is required between that of the heating fluid and that of the plastic material to provide any given extruding temperature. The elongated cross-sectional configuration of each passageway as shown in FIG. 5 also helps in maintaining a substantial flow of oil while providing for minimum spacing between adjacent rows of orifices.

Another important feature provided by a die plate constructed in accordance with the invention is the reduction in axial thickness at the orifices 60 which enables the inlet pressure of the plastic material in the inlet face 18 to be reduced. The angular spaced arcuate cavities 62 within the center section 15 and the strengthening ribs 55 provide a construction in which the axial length of the orifices is substantially less than the overall thickness of the die plate. Furthermore, by forming the tapered leading edge portion 56 on each of the ribs 55, the smooth flow of the plastic material into the orifices 60 is not disturbed, leaving no flat areas against which the flow of plastic material can become stagnant, preventing the degradation of material which occurs when critical plastics are subject to excessive heat for too long a period of time.

It has also been found that the die plate 10 provides for an economical construction. For example, the radially extending manifolds 45 can be easily formed within the center section of the die plate and the substantially smaller parallel spaced passageways 50 can be easily drilled without the danger of the passageways intersecting one or more of the orifices within the inner radial portion of the center section as may occur with radial heating passages and radial rows of nozzles. Furthermore, the plugs 46 provide a simplified means closing the manifold 45 and directing the hot oil outwardly through those passageways 50 which intersect the manifold.

While the form of apparatus hereon described constitutes a preferred embodiment of the invention, it is to be understood that the invention is not limited to this precise form of apparatus, and that changes may be made therein without departing from the scope of the invention which is defined in the appended claims.

What is claimed is:

1. An improved die plate for a plastic pelletizer, comprising an annular plate member having opposite inlet and outlet faces and inner and outer surfaces, means defining a plurality of spaced manifolds extending generally radially within said plate member and dividing said plate into a plurality of segments, means in said member defining a plurality of spaced passageways extending within each said segment of said plate member, each said segment having a group of said passageways extending from said outer surface through said plate member to said inner surface and a further group of said passageways extending from said outer surface and intersecting one of said manifolds defining a said segment, a plurality of extrusion orifices arranged in rows between said passageways and extending axially through each said segment of said plate member, means connected to said inner and outer surfaces of said plate member and cooperating with said surfaces to define a plurality of inner and outer chambers interconnecting said passageway groups, and means defining a plurality of inlets and outlets connected to said outer chambers for circulating heating fluid through said passageways for uniformly heating the material flowing through said orifices.

2. A die plate as defined in claim 1 wherein said manifolds are uniformly arranged within said plate member, plug means within the outer portion of each said manifold, there being one of said outer chambers for each said manifold and interconnecting the outer ends of the said group of passageways intersecting the adjacent said manifold, there being one of said inner chambers for each said manifold and interconnecting the inner end thereof with the inner ends of the adjacent said groups of said passageways extending through said plates, and one of said outer chambers interconnecting the outer ends of said group of said passageways extending through said plate within each segment to provide for flow of fluid in one direction through said groups of said passageways extending through each said segments of said plate and a flow of fluid in the opposite direction through said groups of said passageways intersecting each said manifold.

3. A die plate as defined in claim 1 wherein each said passageway has a cross-sectional dimension in an axial direction of said plate member substantially greater than the cross-sectional dimension of said passageway in a circumferential direction of said plate member to provide for a substantial flow of heating fluid through said die plate.

4. A die plate as defined in claim 1 wherein said means connected to said inner and outer surfaces of said plate member comprise an inner annular member joining with said inner surface of said plate member and an outer annular member joining with said outer surface of said plate member, at least a portion of each said inner chamber formed by said inner annular member, and at least a portion of each said outer chamber formed by said outer surface of said plate member.

5. A die plate as defined in claim 1 wherein each said segment of said plate member includes means defining an arcuate cavity within said inlet face, and adjacent said cavities spaced to form a generally radially extending rib on said inlet face to provide said plate wtih substantial strength while minimizing the axial length of said orifices.

6. A die plate as defined in claim 5 wherein one of said ribs is axially aligned with each said manifold and projects axially therefrom, and each said rib including a tapered leading edge surface for streamlining the flow of plastic material into said cavities and said orifices.

7. An improved die plate for a plastic pelletizer, comprising an annular plate member having opposite inlet and outlet faces and inner and outer surfaces, means defining a plurality of circumferentially spaced passageways extending within said plate member between said outer surface and said inner surface, means defining a plurality of angularly spaced arcuate cavities within said inlet face of said plate member, a plurality of extrusion orifices extending axially from each said cavity to said outlet face between adjacent said passageways, means in said plate member between said cavities forming a corresponding plurality of generally radially extending ribs for providing said plate member with substantial strength while minimizing the length of said orifices and the back pressure required for extrusion, means connected to said inner and outer surfaces of said plate members and cooperating with said plate member to define a plurality of inner and outer chambers interconnecting said passageways, and means defining a plurality of inlets and outlets connected to said outer chambers for circulating heating fluid inwardly and outwardly through said passageways.

8. A die plate as defined in claim 7 wherein each said rib includes a tapered leading edge surface for streamlining the flow of plastic material into said orifices.

9. A die plate as defined in claim 7 wherein said cavities divide said plate member into a corresponding plurality of sectors, said passageways in each said sector arranged in parallel spaced relation, and said orifices in each said sector arranged in parallel spaced rows between said passageways.

10. An improved die plate for a plastic pelletizer, comprising an annular plate member having inner and outer surfaces, said plate member having a plurality of arcuate sectors each having means defining a plurality of parallel spaced passageways, a group of said passgeways in each said sector extending between said inner and outer surfaces, means connecting other groups of said passageways in adjacent sectors intermediate said inner and outer surfaces, a plurality of extrusion orifices arranged in parallel spaced rows and extending axially through each section of said plate member between adjacent said passageways, closure means connected to said inner and outer surfaces of said plate member and having therein means interconnecting said passageways and further defining a plurality of inlets and outlets for circulating heating fluid through said passageways and said interconnecting means for uniformly heating the plastic material flowing through said orifices.

11. An improved die plate for a plastic pelletizer, comprising an annular plate member having inner and outer surfaces, said plate member having a plurality of arcuate segments each having means defining a plurality of parallel spaced passageways extending between said inner and outer surfaces, a plurality of extrusion orifices arranged in parallel spaced rows and extending axially through each section of said plate between adjacent said passageways, means connected to said inner and outer surfaces of said plate and cooperating with said surfaces to define a plurality of inner and outer chambers interconnecting groups of said passageways, means defining a plurality of inlets and outlets connected to said outer chambers, and said inner and outer chambers being arranged in overlapping relation to provide for an inward flow of heating fluid through some groups of passageways and an outward flow through other groups of said passageways to direct heating fluid through said plate member for uniformly heating the plastic material flowing through said orifices.

References Cited

UNITED STATES PATENTS

| | | |
|---|---|---|
| 2,642,819 | 6/1953 | Budsoll. |
| 3,230,583 | 1/1966 | Hoffman et al. |
| 3,271,821 | 9/1966 | Street. |

WILLIAM J. STEPHENSON, Primary Examiner